United States Patent [19]

Ewen et al.

[11] Patent Number: 4,684,428

[45] Date of Patent: Aug. 4, 1987

[54] METHOD OF MAKING A FUSION PAD

[75] Inventors: A. T. E. Ewen, Nazeing; J. P. Stone, Welwyn Garden City, both of United Kingdom

[73] Assignee: Glynwed Tubes and Fittings Limited, Sheldon, United Kingdom

[21] Appl. No.: 823,819

[22] Filed: Jan. 28, 1986

Related U.S. Application Data

[63] Continuation of Ser. No. 613,517, May 23, 1984, abandoned.

[30] Foreign Application Priority Data

Apr. 27, 1984 [GB] United Kingdom ................ 8410765.

[51] Int. Cl.$^4$ ............................................. B32B 31/18
[52] U.S. Cl. .................................... 156/257; 219/535; 219/544; 285/21
[58] Field of Search ...................... 156/47, 48, 51, 138, 156/139, 140, 143, 144, 149, 257; 219/544, 535; 29/456, 611; 285/21

[56] References Cited

U.S. PATENT DOCUMENTS

| 4,147,926 | 4/1979 | Stähli | 219/544 |
| 4,176,274 | 11/1979 | Lippera | 29/456 |
| 4,251,306 | 2/1981 | Breher | 156/139 |
| 4,375,591 | 3/1983 | Sturm | 219/544 |
| 4,455,482 | 6/1984 | Grandclement | 219/544 |
| 4,470,193 | 9/1984 | Karel et al. | 156/257 |

FOREIGN PATENT DOCUMENTS 1440713 6/1976 United Kingdom .................. 285/21

Primary Examiner—Caleb Weston
Attorney, Agent, or Firm—Brooks & Kushman

[57] ABSTRACT

A fusion pad is produced by forming a spiral groove 22 in the pad upper surface. A wire 16 is fed from a reel 18 through a hole in the pad and secured to a terminal on the pad under surface. The pad is rotated causing the wire 16 progressively to enter the groove 22. The groove side walls have a height greater than the diameter of the wire 16 to ensure that the groove walls project above the wire 16 in the groove 22. An electrical heating tool 26 is applied to each part of the groove 22 as soon as the wire 16 is located in that groove part to cause the adjacent groove walls 24 to melt at their upper regions. These molten upper regions collapse inwardly onto the wire 16 therebetween and solidify to retain the wire 16 in the groove 22.

5 Claims, 8 Drawing Figures

METHOD OF MAKING A FUSION PAD

This application is a continuation of application Ser. No. 613,517, filed May 23, 1984, now abandoned.

The present invention relates to a pad adapted for attachment by fusion to a curved member; both the pad and the curved member being made of plastics material.

The invention is particularly concerned with but not restricted to what is known as a tapping saddle for connecting two pipes of plastics material at an angle to one another with one pipe leading into the wall of the other pipe. A tapping saddle is particularly useful for connecting together pipes intended to carry a liquid or gas such as for example pipes forming part of a gas or water main system.

FIG. 1 is a perspective view from below of a tapping saddle, and

FIG. 2 is a perspective view from above of a tapping saddle connected to a pipe.

Referring to FIGS. 1 and 2, a tapping saddle has a pad 2 for connection to a main pipe 4, a tubular body 6 leading from the pad 2, and a branch pipe 8 leading from the body 6. In the case of a gas or water main, the pipe 4 is the main pipe and the branch pipe 8 leads to a consumer point such as for example a house.

It will be appreciated that the pad 2 and the corresponding region of the wall of the pipe 4 have to be heated in order that they may be fused together. A previously proposed method of carrying out this heating is to locate a heating coil in the pad 2. This is achieved by winding a plastics coated wire into a flat spiral, heat sealing this spiral into a single piece that can be curved to the required pipe diameter, and fixing terminals to the two ends of the heat sealed spiral. This spiral, complete with the terminals, is curved to the required pipe diameter before spiral and terminals are loaded into an injection moulding tool for encapsulation. The plastics coating is used to maintain the correct wire spacing between adjacent ends of the spiral, and between the coil and the pipe 4. In consequence with this method it is not possible to adjust the wire spacing to obtain the optimum heating conditions.

Another previously proposed method is the technique of hot-plate welding this method involves the use of a welding plate which is concave on one side and convex on the other side; the plate curvature being arranged to conform to the curvature of the pipe wall. The plate is heated to the operational temperature, the concave side is placed on the wall of the pipe 4, and the pad 2 of the tapping saddle is placed on the convex side of the plate. After a preselected time period, the welding plate is removed and the heated pad 2 and pipe 4 are pressed together to make the joint.

The problem with this technique is that it is very dependant on the skill of the operator, and also on the site and weather conditions. Adverse conditions, such as rain, mud, low temperature and high winds, can reduce the interface temperature and cause poor jointing.

STATEMENT OF INVENTION

It is an aim of the invention to alleviate this difficulty, and according to one aspect of the present invention there is provided a method of producing a fusion pad comprising forming in one surface of the pad a continuous groove extending between an inner end and an outer end, locating in the groove an electrically conductive wire having a diameter less than the depth of the groove, and melting the upper portion of the groove to retain the wire in the groove.

In this specification by "fusion pad" is meant a member of generally sheet-like form which is adapted to be attached by fusion to another member.

The wire may then be secured to terminals on the pad, and if desired the pad may then be curved to a desired curvature.

According to another aspect of the present invention there is provided a fusion pad produced by the aforementioned method.

FIGURES IN THE DRAWINGS

An embodiment of the invention will now be described by way of example with reference to the accompanying drawings in which:

FIG. 3 is an underside perspective view of a fusion pad of the invention,

FIG. 4 is an upper perspective view of the fusion pad of FIG. 3 with the wire being located in the groove, FIG. 5 is an enlarged sectional side view of the groove of the fusion pad, FIG. 6 is a sectional side view of a punch for curving the fusion pad, FIG. 7 is a perspective view of the shaped curved fusion pad, and FIG. 8 is a perspective view of a wire placement and sealing apparatus.

DESCRIPTION OF THE DRAWINGS

Referring particularly to FIG. 4 the wire 16 emerging from the hole 20 is guided into the inner end of a spiral groove 22 which is formed in the upper surface of the pad 14. The pad 14 is rotated so as to cause the wire 16 progressively to enter the groove 22.

Figure 7:
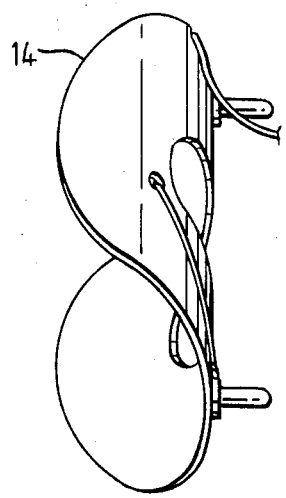
Figure 2:
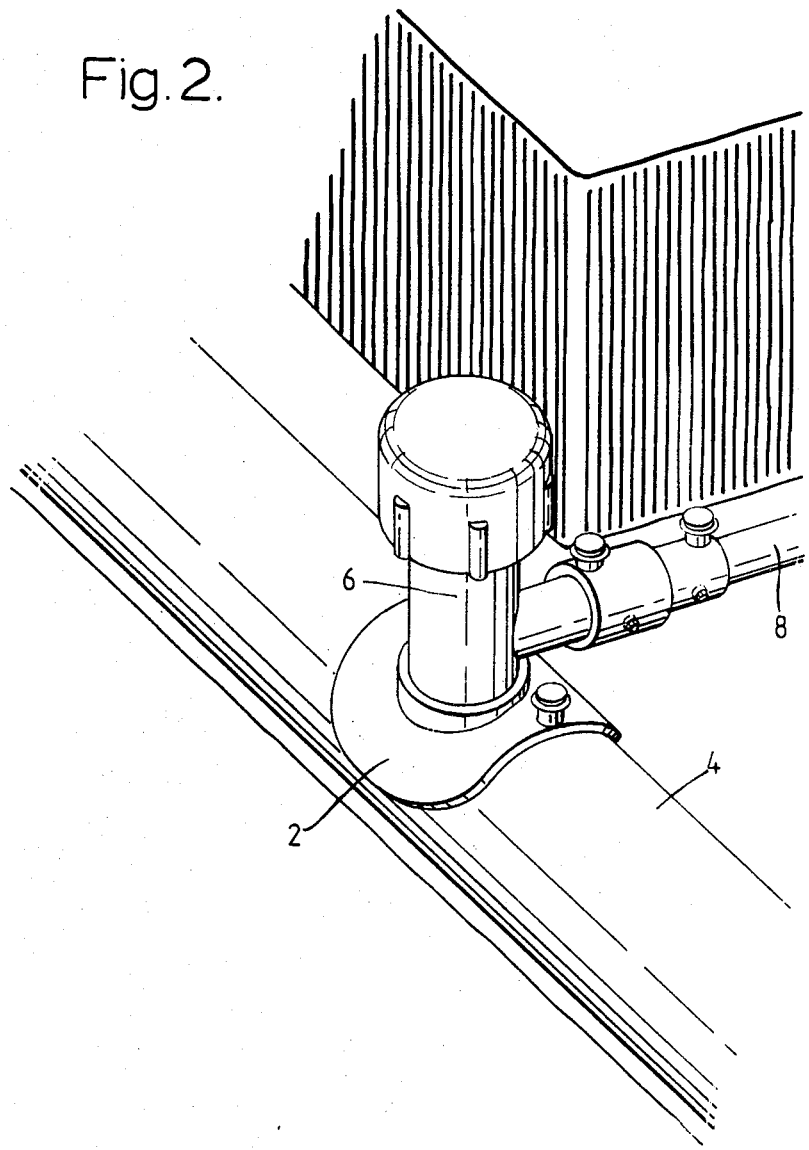
Figure 3:
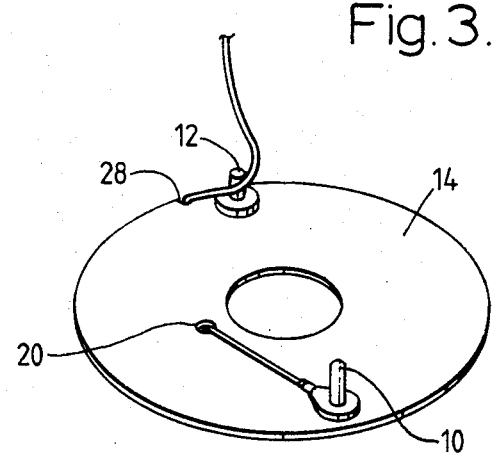
Referring to FIGS. 3 and 4 two terminals 10 and 12 project from what will hereinafter be referred to as the underside of a fusion pad 14. An electrically conductive wire 16 which is wound on a reel 18, has one end passed through a hole 20 in the pad 14 and is secured to the terminal 10.

The fusion pad 14 is then located on the forming surface of a tool base 30, and a punch 32 is pressed onto the tool base 30 to shape the pad 14 into the required curvature as illustrated in FIG. 7. Because of the previously described technique of retaining the wire 16 in the groove 22, this curving of the pad 14 does not cause the wire 16 to come out of the groove 22. The curved shaped pad 14 is connected to a tubular body, such as the previously described body 6, to form a tapping saddle.

In operation the pad 14 is placed against an appropriate region of a pipe wall, an electrical heating source is connected to the terminals 10 and 12, and the heating coil formed by the wire 16 is heated to fuse the pad 14 to the contacting region of the pipe wall. The power source is disconnected from the terminals 10 and 12, and the tapping saddle is secured to the pipe wall ready for use.

Most known thermoplastics are suitable for producing the pad 14; one example of a suitable thermoplastics is medium or high density polyethylene. The illustrated described pad 14 has a thickness in the range from 0.5 mm to 2.0 mm in order to keep the wire 16 close to the adjoining faces of the pad 14 and the pipe. A wire 16 having a diameter in the range from 0.4 mm to 2.0 mm is suitable to provide a good joint for pipes having diameters from 15 mm to in excess of 500 mm. The type of wire 16 suitable will depend on the heat required for providing different sizes of joints.

It is important that the pad 14, and the body 6, and the pipe wall are all made of the same family of thermoplastics material, such as for example polyethylene.

The height of the groove side walls 24 above the wire 16 should be in the range from 15% to 50% of the wire diameter and will depend on the width of the thermoplastics material between adjacent turns of the wire 16. The spacing between adjacent turns of the wire 16 is arrived at as a result of laboratory and quality assurance tests until the required operational performance is achieved. The width of the groove 22 can be in the range from the diameter of the wire 16 to the wire diameter plus approximately 10%.

If desired, when winding the wire 16 into the groove 22, the wire may be held in place in the groove 22 by the top plate of a wire placement jig until the groove 22 is filled with the wire. The upper part of the groove walls 24 are then heated to trap the wire 16 in the groove 22 prior to removing the pad 14 from the jig.

Figure 8:
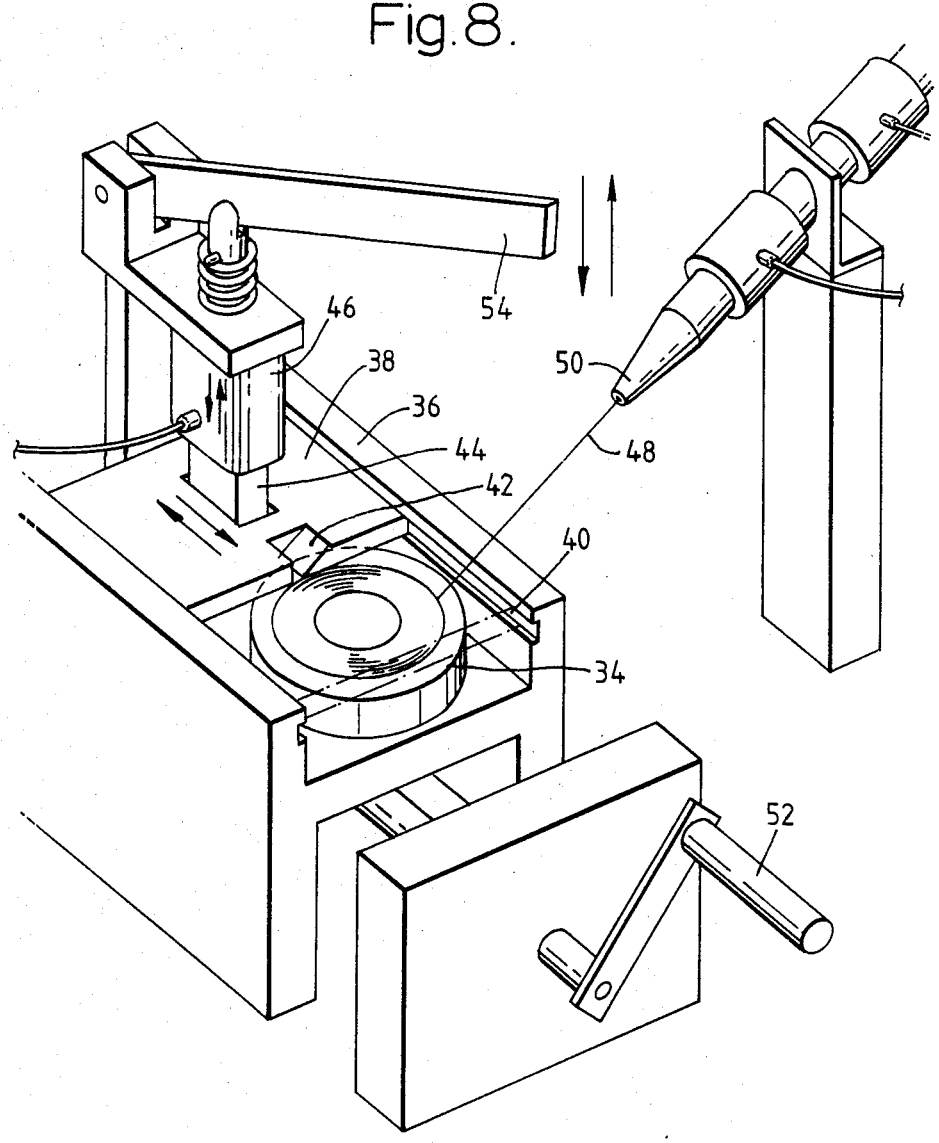

Referring to FIG. 8, a wire placement and sealing apparatus includes a turn table 34 which is rotatably mounted on a support structure 36. A guide plate 38 is slidably mounted in grooves 40 in the upper region of the support structure 36. A slot 42 is formed in the guide plate 38 to extend along a radius of the turn table 34. A heating tool 44 is adjustably mounted in the guide plate 38; this heating tool 44 being heated by an electrical heater band 46.

In operation, wire 48 is fed from a nozzle 50 through the hole 20 in the fusion pad 14 and attached to the terminal 10 on the underside of the pad 14. The pad 14 is then loaded onto the turn table 34 with the groove 22 upper most. The guide plate 38 is slid forward so that the slot 42 lies over the groove 22, and the wire 48 is arranged to pass through the slot 42. The slot 42 is sufficiently long to allow the wire 48 to enter the entire range of the groove 22.

The turn table 34 is rotated by turning a handle 52 thereby causing the wire 48 progressively to enter the spiral groove 22 until the wire reaches the outer end of the spiral groove 22. The wire 48 is then cut to length, fed through the notch 28 and secured to the terminal 12. During this winding operation the wire 48 is retained in the groove 22 by the guide plate 38; the lower surface of the guide plate 38 just clearing the top of the groove walls 24.

The guide plate 38 is slid forwardly to locate the heating tool 44 over the groove 22. The heating tool 44 extends radially over the turn table 34, and is sufficiently long to embrace the entire radial range of the spiral groove 22. The heater band 46 is energised to heat the heating tool 44 which is then lowered by the arm 54 to contact and heat up the top of the groove walls 24. Because of the heating action of the heating tool 44 the groove walls become molten at their upper region. The turn table 34 is again rotated by the handle 52, and the consequent wiping action of the heating tool 44 spreads the molten upper regions of the groove walls 24 over the wire 48 in the groove 22. When the heating tool 44 has wiped the entire length of the groove 22, the heating tool 44 is withdrawn from contact with the groove walls 24. The collapsed wiped upper regions of the groove walls 24 then solidify in that position so as to retain the wire 48 in the groove 22. The guide plate 38 is then slid clear of the turn table 34, and the pad 14 is removed in preparation for location on the forming surface of the tool base 30.

Figure 1:
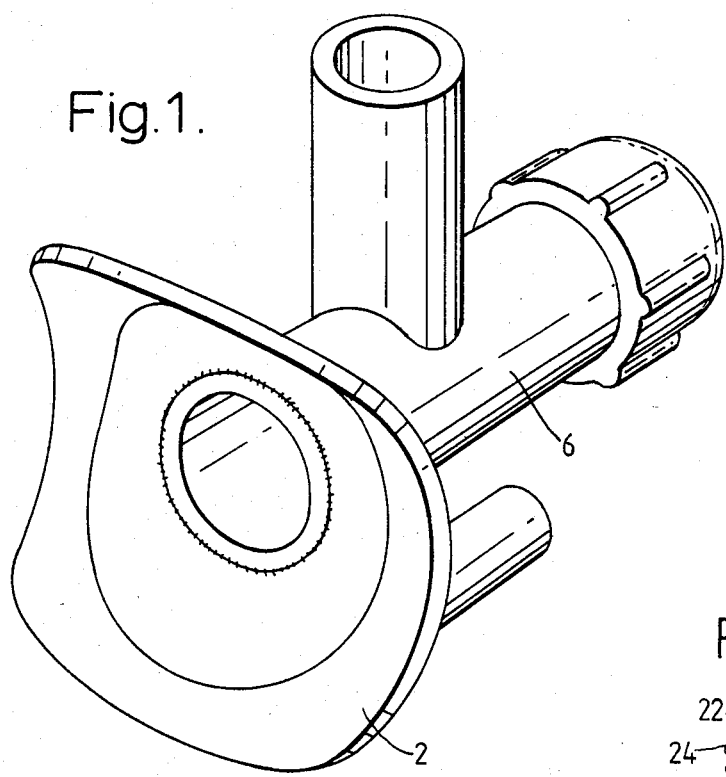
Figure 5:
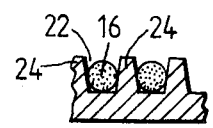
As shown in FIG. 5, the side walls of the groove 22 have a height greater than the diameter of the wire 16 thereby ensuring that the groove walls 24 project above the wire 16 in the groove. An electrical heating tool 26 is applied to each part of the groove 22 as soon as the wire 16 is located in that groove part thereby causing the adjacent groove walls 24 to heat up and become molten at their upper regions. These molten upper regions of the groove walls collapse inwardly onto the wire 16 therebetween, and these walls 24 solidify in that position after they emerge from the heating tool 26 so as to retain the wire 16 in the groove. It will be appreciated from FIG. 4 that by rotating the pad 14 for a sufficient number of revolutions and causing the heating tool 26 to travel outwardly from the inner to the outer end of the groove 22, then the wire 16 is retained in the entire length of the groove 22. The wire 16 is then fed through a notch 28 in the outer periphery of the pad 14 and secured to the terminal 12.
Figure 6:
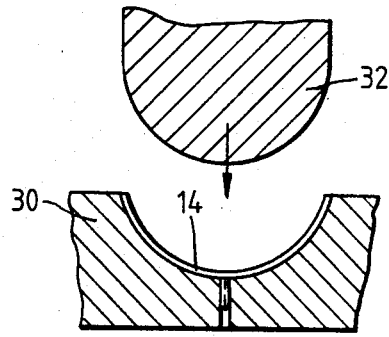
Figure 4:
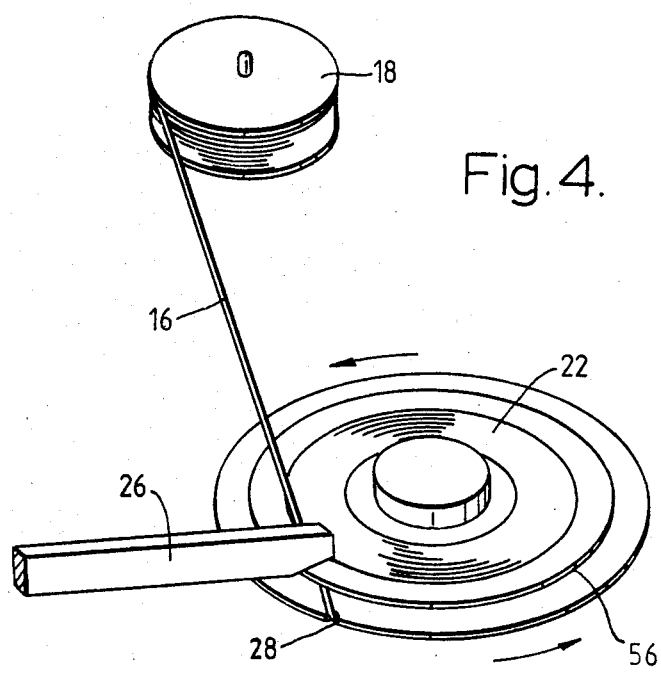

Referring to FIGS. 4 and 5, the upper surface of the collapsed and solidified groove walls 24 will be above the upper surface of that part of the fusion pad 14 outside the spiral groove 22. These two levels meet at a ridge 56 illustrated in FIG. 4.

The described and illustrated technique of using a fusion pad is found to be less expensive than the previously known technique of using full wrap round of the pipe. This full wrap round involves the use of two semi-circular pads or clips which fit round opposite portions of the pipe. Each clip has two opposite outwardly extending ears, and the facing ears of opposite clips are bolted together so that the two clips extend completely round the pipe. The clips are held together by bolts, and the electrical heating of the clip or pad onto the pipe is sufficiently strong only to seal in the contents of the pipe.

Referring to FIGS. 3 to 7, in general the width of the groove walls 24 is equal to the diameter of the wire 16, and this ratio is altered only when necessary. The spacing between adjacent turns of the wire 16 is arrived at as a result of laboratory and quality assurance tests until the required operational performance is achieved.

Although the pad 14 has been described as having a thickness in the range from 0.5 mm to 2.0 mm it is the intention to reduce the pad thickness to a minimum. In consequence a pad thickness of 0.2 mm or less is envisaged.

We claim:

1. A method of producing a thermoplastic fusion pad for fusion to a convex thermoplastic surface, the method comprising the steps of:

forming in one substantially flat surface of the pad, which is to be fused to the convex surface and which is opposite a surface of the pad having terminals, a continuous spiral groove extending between an inner and an outer end, rotating the pad, locating in the groove an electrically conductive wire having a diameter less than the depth of the groove during the step of rotating, holding the wire in the groove during the step of rotating, melting the upper portion of substantially the entire groove during the step of rotating and during the step of holding, wiping the melted upper portion over substantially the length of the wire in the groove during the step of rotating to retain the wire in the groove and shaping the pad to have a predetermined, curved, shape in which the one surface of the pad is concave for seating on the convex surface.

2. A method as claimed in claim 1 in which the wire is passed through a guide means before entering the groove, said guide means retaining the wire in the groove until the groove upper portion is melted.

3. A method as claimed in claim 1 in which the groove upper portion is melted by a heater which extends across the wire as the pad is rotated.

4. A method as claimed in claim 1 in which each part of the groove upper portion is melted progressively as soon as the wire is located therein.

5. A method as claimed in claim 4 in which the groove upper portion is melted by moving a heating tool across the wire as the pad is rotated.

* * * * *